Figure 1:
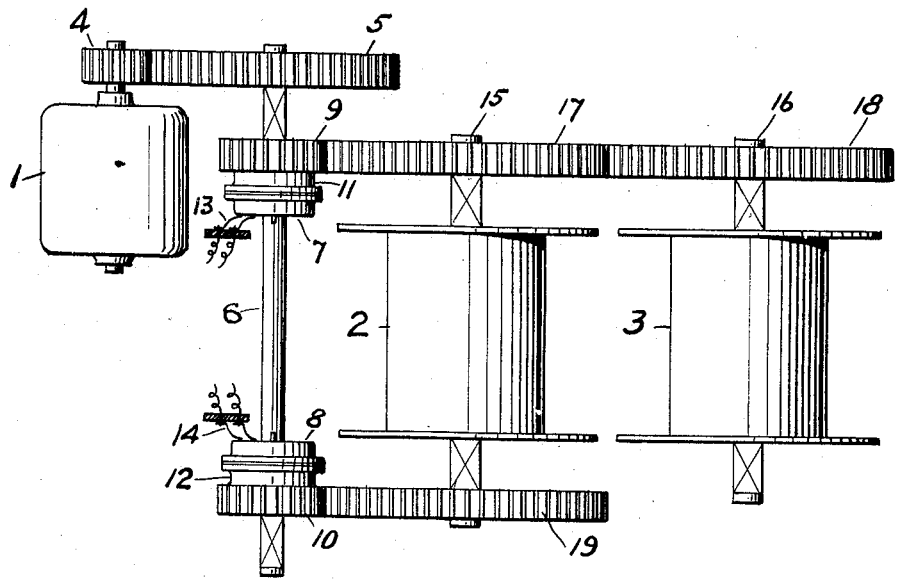

March 4, 1930.    R. H. BEAUMONT    1,749,060
CABLE CONTROL DEVICE
Filed Dec. 24, 1928

WITNESS:
Rob R Kitchel.

INVENTOR
Robert H. Beaumont
BY
Augustus B. Stoughton
ATTORNEY.

Patented Mar. 4, 1930

1,749,060

UNITED STATES PATENT OFFICE

ROBERT H. BEAUMONT, OF RADNOR, PENNSYLVANIA, ASSIGNOR TO R. H. BEAUMONT COMPANY, OF PHILADELPHIA, PENNSYLVANIA, A CORPORATION OF PENNSYLVANIA

CABLE-CONTROL DEVICE

Application filed December 24, 1928. Serial No. 328,253.

The object of this invention is to provide a control for the driving drums of a cable and is particularly adapted for use on driving drums of a cable drag scraper or may be used in connection with the driving drums of any machine employing a cable the ends of which are fastened to separate driving drums. The invention consists essentially in employing electromagnetic clutches between the actuating motor and the cable driving drums driven thereby.

Another feature of my invention is the means whereby one of the clutches acts as a brake when it is not in full connecting position.

In the prior art similar driving drums were controlled by mechanical friction clutches of the standard cone or band type. These clutches were either operated manually by means of interlocking levers or actuated by a motor through a linkage of levers and remote electrical control provided for the motor. The present invention makes possible the direct control of the clutches themselves from a remote position wherever convenient.

For a more complete exposition of my invention reference may be had to the annexed specification and drawing. In the drawings, Figure 1 is a plan view of the cable driving drums and the motor for actuating them.

Figure 2:
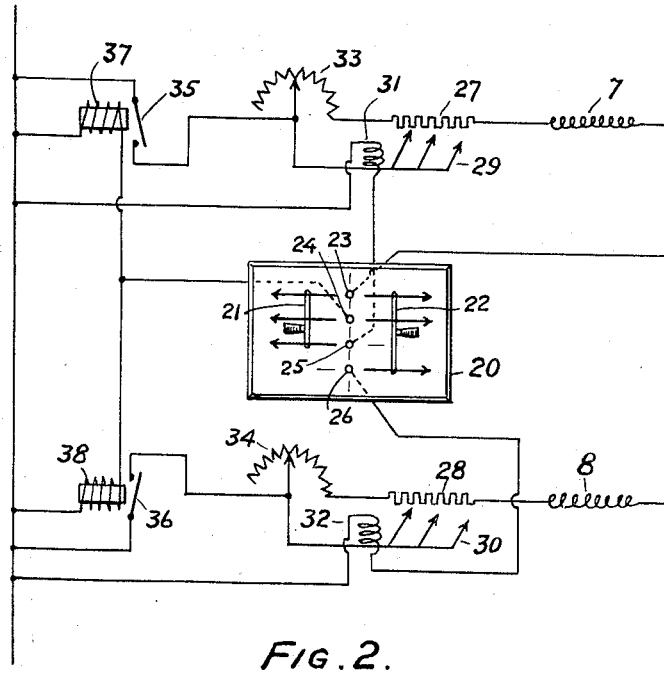

Fig. 2 is an electrical diagram of the control means for the magnetic clutches.

Referring to Figure 1, 1 is the electric motor which drives the drums 2 and 3.

The motor shaft has mounted thereon pinion 4 which drives gear 5, which is fast on shaft 6. Shaft 6 is carried in bearings (each bearing being indicated on the drawing by an X) and has fast thereon electric magnetic clutch halves 7 and 8. Pinions 9 and 10 and the corresponding magnetic clutch halves 11 and 12 are free to rotate on shaft 6. Brushes 13 and 14 have attached thereto the electric lead-in wires (indicated as pigtails in Figure 1) which lead the currents to clutches 7—11 and 8—12, respectively. Drum 2 is keyed to shaft 15 and drum 3 is keyed to shaft 16. These shafts are carried in bearings (each bearing being indicated on the drawing by an X). Pinion 9 drives gear 17 which is loose on shaft 15 which, in turn, drives gear 18 keyed to shaft 16, thereby driving drum 3. Pinion 10 drives gear 19 which is keyed to shaft 15 and which, therefore, drives drum 2.

Thus it will be seen that when clutch 7—11 is magnetized drum 3 will be driven by motor 1 through the gear train 4, 5, 9, 17 and 18. When clutch 8—12 is energized motor 1 drives drum 2 through the gear train 4, 5, 10 and 19. My invention may either be used in this manner or the clutches may be electrically intercontrolled, as explained below to provide that when one clutch is fully energized the other clutch will be weakly energized so that the weakly energized clutch acts as a brake on the drum controlled thereby to prevent its paying off an excess of cable.

One means for attaining this electrical interconnection is illustrated in the diagram in Figure 2. Coils 7 and 8 represent the driving clutch halves.

20 represents the master controller for the magnetic clutches which has two interconnected movable members 21 and 22 adapted to contact with the stationary contacts 23, 24, 25 and 26 respectively. Coils 7 and 8 are controlled by starters 27 and 28 having a plurality of rotatable fingers 29 and 30 actuated by coils 31 and 32 so as to rotate into contact with the starter resistances 27 and 28 and thereby to shunt out varying amounts of these resistances. In series with coils 7 and 8 and with starters 27 and 28 are rheostats 33 and 34 respectively. These rheostats are variable and are provided to make an adjustment as wear occurs in the electromagnetic clutches. Coils 7 and 8 and resistances 27, 33, and 28, 34 respectively are controlled by switches 35 and 36 in series therewith. These switches are controlled by coils 37 and 38. By tracing through the circuits of this diagram it will be seen that when either of the movable contact members 21 or 22 is placed in contact with the stationary contacts one of the clutch coils 7 or 8 is fully energized because one of the starter coils 31 or 32 is energized to shunt out all the resistance 27 or 28. The other coil 7 or 8 is weakly energized through the resistances in series to act as a brake for the drum controlled thereby.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

A cable control device comprising in combination a driving motor, two separate cable drums keyed to two separate shafts, a third shaft having two driving members for two electric clutches fast thereon and two driven members of two electric clutches rotatable thereon, pinion members rotatable on said third mentioned shaft adapted to be driven by said electric clutch members, gear trains between said first and second mentioned shafts and said pinions on said third mentioned shaft for driving said drums, means for driving said third mentioned shaft from said motor, and brushes for carrying current to said clutches.

ROBERT H. BEAUMONT.